(12) United States Patent
Dingler et al.

(10) Patent No.: US 9,112,707 B2
(45) Date of Patent: Aug. 18, 2015

(54) SYSTEM AND METHOD FOR PROVIDING LOCATION BASED SERVICES USING COLLABORATIVE NETWORKS

(75) Inventors: John R. Dingler, Dallas, GA (US); Sri Ramanathan, Lutz, FL (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1404 days.

(21) Appl. No.: 12/192,193

(22) Filed: Aug. 15, 2008

(65) Prior Publication Data

US 2010/0042519 A1 Feb. 18, 2010

(51) Int. Cl.

| | |
|---|---|
| *G07B 17/00* | (2006.01) |
| *G07F 19/00* | (2006.01) |
| *G06F 15/16* | (2006.01) |
| *G06F 15/177* | (2006.01) |
| *G06F 15/173* | (2006.01) |
| *G08B 5/22* | (2006.01) |
| *H04Q 1/30* | (2006.01) |
| *H04L 12/14* | (2006.01) |
| *G01S 5/00* | (2006.01) |
| *G06Q 10/06* | (2012.01) |
| *H04W 4/02* | (2009.01) |
| *H04L 29/08* | (2006.01) |
| *G06Q 40/00* | (2012.01) |
| *H04L 29/06* | (2006.01) |

(52) U.S. Cl.
CPC ............ *H04L 12/1432* (2013.01); *G01S 5/0009* (2013.01); *G06Q 10/06* (2013.01); *G06Q 40/12* (2013.12); *H04L 12/14* (2013.01); *H04L 67/306* (2013.01); *H04W 4/02* (2013.01); *H04L 65/1016* (2013.01)

(58) Field of Classification Search
CPC ...... H04W 84/08; H04W 8/16; G01S 5/0054; G01S 5/02
USPC .......... 705/30; 709/225, 229, 206; 455/456.1, 455/466, 406, 515, 520, 404, 445; 715/201; 707/999.001, 999.009; 340/7.27
See application file for complete search history.

(56) References Cited

U.S. PATENT DOCUMENTS 5,485,163 A * 1/1996 Singer et al. .................. 342/457
6,823,190 B2 * 11/2004 Ford et al. .................. 455/456.3
(Continued)

FOREIGN PATENT DOCUMENTS

WO WO 03/046762 6/2003

OTHER PUBLICATIONS

Hodes, T. D., & Katz, R. H. (1999). Composable ad hoc location-based services for heterogeneous mobile clients. Wireless Networks, 5(5), 411-427. Retrieved from http://search.proquest.com/docview/213387790?accountid=14753.*

(Continued)

*Primary Examiner* — Olusegun Goyea
(74) *Attorney, Agent, or Firm* — Matthew Chung; Roberts Mlotkowski Safran & Cole, P.C.

(57) ABSTRACT

A system and method is provided for providing location based services. The system includes at least one module configured to publish location information of a mobile user using a publish subscribe format based on a user preference mode of notification.

8 Claims, 3 Drawing Sheets

(56) References Cited

U.S. PATENT DOCUMENTS

| | | | |
|---|---|---|---|
| 6,885,874 B2* | 4/2005 | Grube et al. | 455/520 |
| 7,269,426 B2* | 9/2007 | Kokkonen et al. | 455/456.1 |
| 7,342,917 B2* | 3/2008 | Mohan et al. | 370/352 |
| 7,581,166 B2* | 8/2009 | Renger et al. | 715/201 |
| 2003/0023726 A1* | 1/2003 | Rice et al. | 709/225 |
| 2003/0060214 A1* | 3/2003 | Hendrey et al. | 455/456 |
| 2003/0100326 A1* | 5/2003 | Grube et al. | 455/515 |
| 2003/0153330 A1* | 8/2003 | Naghian et al. | 455/456 |
| 2003/0208754 A1* | 11/2003 | Sridhar et al. | 725/34 |
| 2004/0203854 A1* | 10/2004 | Nowak | 455/456.1 |
| 2004/0259574 A1* | 12/2004 | Daniels et al. | 455/456.3 |
| 2005/0030977 A1* | 2/2005 | Casey et al. | 370/485 |
| 2006/0025158 A1* | 2/2006 | Leblanc et al. | 455/456.2 |
| 2006/0046744 A1* | 3/2006 | Dublish et al. | 455/456.3 |
| 2006/0166646 A1* | 7/2006 | Roach | 455/411 |
| 2006/0166648 A1* | 7/2006 | Roach | 455/411 |
| 2006/0253408 A1* | 11/2006 | Dvorak | 707/1 |
| 2007/0015519 A1* | 1/2007 | Casey | 455/456.2 |
| 2007/0043687 A1* | 2/2007 | Bodart et al. | 707/1 |
| 2007/0136360 A1* | 6/2007 | Randall et al. | 707/102 |
| 2007/0161382 A1* | 7/2007 | Melinger et al. | 455/456.1 |
| 2007/0226307 A1* | 9/2007 | Bae et al. | 709/206 |
| 2007/0270159 A1* | 11/2007 | Lohtia et al. | 455/456.1 |
| 2007/0281689 A1* | 12/2007 | Altman et al. | 455/435.1 |
| 2008/0021963 A1* | 1/2008 | Jana et al. | 709/206 |
| 2008/0034056 A1* | 2/2008 | Renger et al. | 709/217 |
| 2008/0119160 A1* | 5/2008 | Andriantsiferana et al. | 455/406 |
| 2008/0132252 A1* | 6/2008 | Altman et al. | 455/457 |
| 2008/0155453 A1* | 6/2008 | Othmer | 715/774 |
| 2008/0235230 A1* | 9/2008 | Maes | 707/9 |
| 2009/0005018 A1* | 1/2009 | Forstall et al. | 455/414.1 |
| 2009/0112457 A1* | 4/2009 | Sanchez et al. | 701/201 |
| 2009/0182565 A1* | 7/2009 | Erickson et al. | 705/1 |
| 2009/0271471 A1* | 10/2009 | Mannar | 709/202 |
| 2009/0271486 A1* | 10/2009 | Ligh et al. | 709/206 |
| 2010/0024045 A1* | 1/2010 | Sastry et al. | 726/28 |

OTHER PUBLICATIONS

Liu, Z. (2002). A java-based wireless framework for location-based services applications (Order No. MQ76281). Available from ProQuest Dissertations & Theses Full Text. (304792551). Retrieved from http://search.proquest.com/docview/304792551?accountid=14753.*

Gruteser, M. O. (2004). Privacy for location-based queries through automatic resolution control (Order No. 3136620). Available from ProQuest Dissertations & Theses Full Text. (305203094). Retrieved from http://search.proquest.com/docview/305203094?accountid=14753.*

* cited by examiner

SYSTEM AND METHOD FOR PROVIDING LOCATION BASED SERVICES USING COLLABORATIVE NETWORKS

FIELD OF THE INVENTION

The invention generally relates to a system and method to provide location tracking services and, in particular, a system and method for providing location based services using collaborative networks such as the Web 2.0.

BACKGROUND

Faced with an increasingly difficult challenge in growing both average revenue per user (ARPU) and numbers of subscribers, wireless carriers are trying to develop a host of new products, services, and business models based on data services. One such service is location services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam; and
Providing weather reports which are germane to the location where the user is using the mobile device, etc.

An advantage of using location services is that the mobile user does not have to manually specify ZIP codes or other location identifiers to use location-based services.

For the network carrier, location-based services provide value add by enabling services such as:

Resource tracking with dynamic distribution (e.g., Taxis, service people, rental equipment, doctors, fleet scheduling, etc.);
Finding people or information for the user (e.g., Person by skill (doctor), business directory, navigation, weather, traffic, room schedules, stolen phone, emergency 911);
Proximity-based notification (push or pull) (e.g., Targeted advertising, buddy list, common profile matching (dating), automatic airport check-in); and
Proximity-based actuation (push or pull) (e.g., Payment based upon proximity (EZ pass, toll watch).

In addition, location based services (LBS) are convenient for sharing location data between wireless devices to wireless devices and from wireless devices to stationary devices like a home computer or stationary tracking system or content provider, etc. This would allow a third party to determine an exact location of a mobile user such as, for example, a family member, friend, employee, etc.

Two methods are commonly in use to determine the location of a wireless device with a third method starting to become more popular. These methods include signal strength of cell towers that are near the wireless device (e.g., triangulation); GPS triangulation; and exposing the LBS as a web service.

The first method determines a wireless device's location by comparing the signal strength of cell towers that are near the wireless device. This method is called triangulation and is substantially the same method that GPS devices use to determine their location. The difference between cell triangulation and GPS triangulation, though, is the signals they use to determine location. The second method, GPS triangulation, uses satellites to determine a device location. In either case, the latitude and longitude are kept in the location services infrastructure.

Another method includes creating location based services by exposing the LBS as a web service. For example, when a device wants an update from the location-based system, it sends a request with the proper authentication credentials and a unique identifier that describes the device that is being tracked. The LBS returns the coordinates of the device being queried.

To date, though, there are a number of reasons that telecommunication networks have not embraced location-based services. These reasons include, for example, the fact that the latencies associated with precision location determination are high and network carriers have consistently wanted to control all services on the device platforms in play, preventing third party location based services to use device processing power and capabilities. Additionally, from a network perspective, location determination is an expensive operation that consumes significant network resources.

SUMMARY

In a first aspect of the invention, a system comprises at least one module configured to publish location information of a mobile user using a publish subscribe format based on a user preference mode of notification.

In another aspect of the invention, a method is provided on software, hardware or a combination of software and hardware. The method comprises: registering a publish subscribe format based on a user preference mode of notification; and publishing location information of a mobile user to an end user using the publish subscribe format.

In yet another aspect of the invention, a system is implemented on computer program product comprising a computer usable medium having readable program code embodied in the medium. The system comprises: a profile manager configured and structured to set up preferences of a mobile user including publish subscribe formats of location information of the mobile user; a service application configured and structured to receive the location information of the mobile user from a location platform and send the location information to a notification gateway; and a rendering agent configured and structured to visually render the location information to the end users based on the publish subscribe formats.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
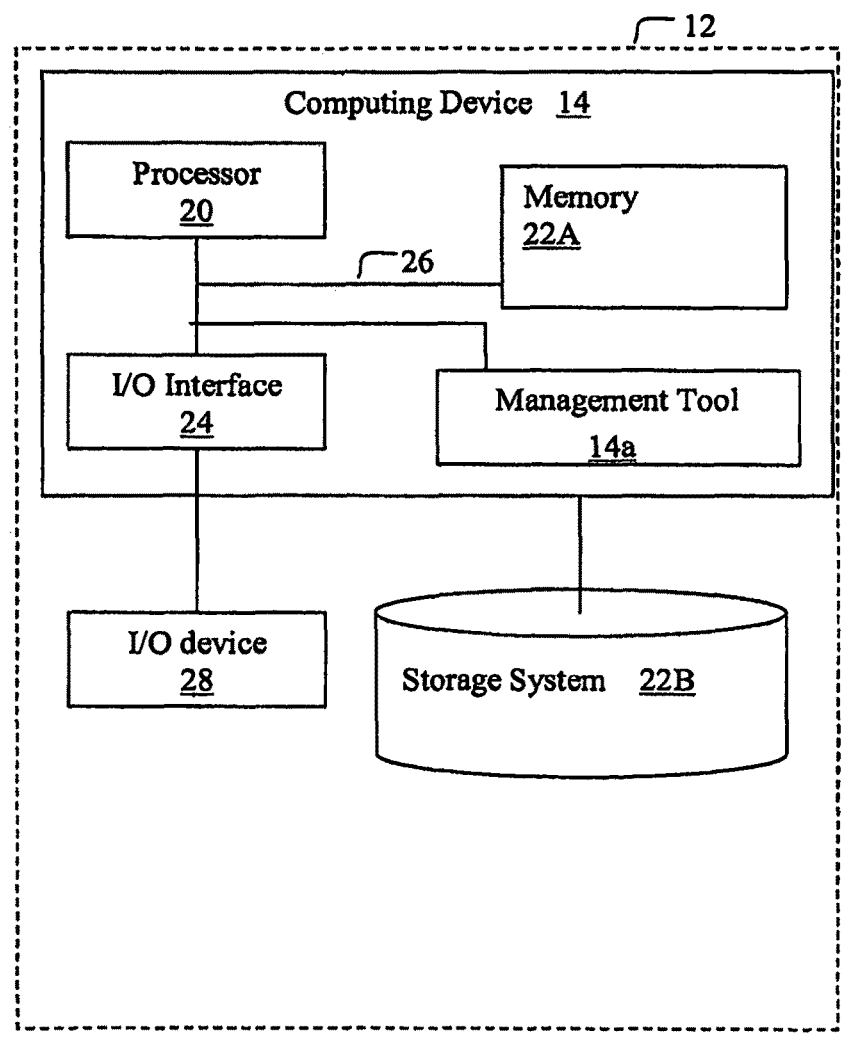
FIG. 1 an illustrative environment for implementing the steps in accordance with the invention.

The invention generally relates to a system and method to provide location tracking services and, in particular, a system and method for providing location based services using collaborative networks such as the Web 2.0. More specifically, the present invention provides a system and method to implement configurable location tracking updates supporting Session Initiation Protocol (SIP), and other notification channels including Diameter integration for IP Multimedia Subsystem (IMS) and non-IMS networks. Those of skill in the art will recognize IMS is an architectural framework for delivering Internet Protocol (IP) multimedia to mobile users. IMS uses protocols such as Session Initiation Protocol (SIP).

As telecommunications networks evolve, there is a strong need for telecommunications networks to drive revenue using more and more innovative services. From a data services ARPU perspective, location based services are an area where there is significant potential for the realization of increased ARPU. However, effective monetization of location based services has been problematic for a number of reasons. For example, Latencies associated with precision location determination are high;

Carriers have consistently wanted to control all services on the device platforms, preventing third party location based services to use device processing power and capabilities;

Location determination is an expensive operation that consumes significant network resources;

There is no integration into next generation network technology especially those based on the IP Multimedia Subsystem specification; and Much of the innovation and business models around location services happen outside the telecommunications domain, requiring higher degrees of interaction that carriers to date have not been willing to adopt.

The present invention, however, provides location based services that can rely on relatively inexpensive cell sector level requests to add considerable value for a whole class of services. For example, in implementation, the present invention allows a mobile user to publish his or her location information via an RSS (Rich Site Summary) or ATOM feed. This allows the mobile user to publish his or her information to a blog or other collaborative web site, thereby allowing for a peer to peer communication model that is increasingly in line with Web 2.0 services. The publication of the location information is highly personalized and configurable, driven by the user as opposed to policy settings that are largely set by the carrier at the carrier gateway end. Those of skill in the art will recognize that Web 2.0 is a term to describe World Wide Web technology aimed at information sharing and collaboration. These concepts have led web-based communities such as wikis, blogs and other social networking sites that encourage user participation.

Advantageously, in implementing the present invention the location information obtained by locating cellular and mobile network users can be made public through a variety of publish subscribe formats such as SMS, SIP based notification, SMTP, Web Services, RSS Feeds and ATOM feed based notifications. This enables value added tracking applications, including direct end user notifications. In addition, the system and method of the present invention integrates into the telecommunication network for both IMS and non-MS networks. The location information can be provided as location updates that drive a tracking map using RSS or ATOM feeds.

In embodiments, the location information can be used by advertisers or other services (end users) to target advertisements or other services to mobile users based on location. In embodiments, the subscribing entities such as, for example, the advertiser or other services and/or users (end user) can be charged a fee to be notified of the location of the mobile user. In the case of advertisements, the service can include a fee for the notification, as well as the pushing of an advertisement or other type of alert (e.g., notification), service or information to the mobile user using the diameter based Rf protocol.

In embodiments, the location information can be obtained by an agent sitting locally on the handheld device of the mobile user, at a service provider or carrier infrastructure. The agent can be used to determine location information using many different methodologies. By way of one example, a local agent residing on the handheld device can use locally cached location information obtained by GPS, A-GPS or mechanisms other than the telecommunications network in order to determine location information. In other embodiments, the agent can obtain information from control plane locating, e.g., the service provider (e.g., network carrier) obtains the location based on the signal-strength of the closest cell-phone towers.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure, a content provider server, or other third party service provider (any of which is generally represented in FIG. 1). The computing device 14 may also be resident on a handheld device.

The computing device 14 includes a Management Tool (module or program control) 14a configured to make computing device 14 operable to perform the services described herein. The implementation of the Management Tool 14a provides a speedy and efficient way in which a mobile user may allow the dissemination of location information to selected end users via an RSS or ATOM feed that is published to, for example, a blog. The Management Tool 14a can be one or more computing modules, representing each of the modules or "players" discussed with reference to FIG. 2. By using this system and methodology, the network carrier will not have to make any significant infrastructure investments, as the preexisting infrastructure is utilized with the present invention.

By way of illustration, the Management Tool 14a can publish a mobile user's location to a WEB 2.0 service. This information, in real-time, can be provided to a subscribing party (end user) in order to obtain the location of the mobile user. This information can be presented to the subscribing party via different methodologies, depending on the selected preferences of the mobile user. More specifically, the publication of the location information can be made public through a variety of publish subscribe formats set as a preference or preferences by the mobile user, depending on a preferred format selected by the mobile user for individual subscribing parties. For example, the location information can be made public using formats such as SMS, SIP, SMTP, Web Services, RSS Feeds and ATOM feed based notifications. Illustratively, a friend or family member may obtain the location information via SMS or RSS or ATOM feeds, whereas, an advertiser may obtain the location information via a subscription to a Web Service. In embodiments, an RSS or ATOM feed can be integrated into a tracking map so that the location information can be visually rendered. Those of skill in the art can implement track-mapping features such that further explanation is not required herein for an understanding of the invention.

The location information can be used by advertisers or other service or content providers to target individuals based on their location. For example, based on a subscription or fee, an advertiser can subscribe or otherwise obtain the location of the mobile user based on the published information and, using this information, target advertisements to the mobile user based on his or her location. In embodiments, the subscribing parties such as, for example, the advertiser, can be charged a fee for obtaining a notification of the user's location, as well as for pushing an advertisement (or service or other information) to the mobile user.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or LBS, could offer to perform the processes described herein. In this case, the service provider can create, maintain, deploy, support, etc., the computer infrastructure that performs the process steps of the invention for one or more customers. The customers may be, for example, a mobile user or a third party requesting information about the location and/or route of the mobile user. In return, the service provider can receive payment from the customer(s) under a subscription and/or fee agreement and/or the service provider can receive payment from the sale of advertising content to one or more third parties.

Exemplary Processes

Figure 2:
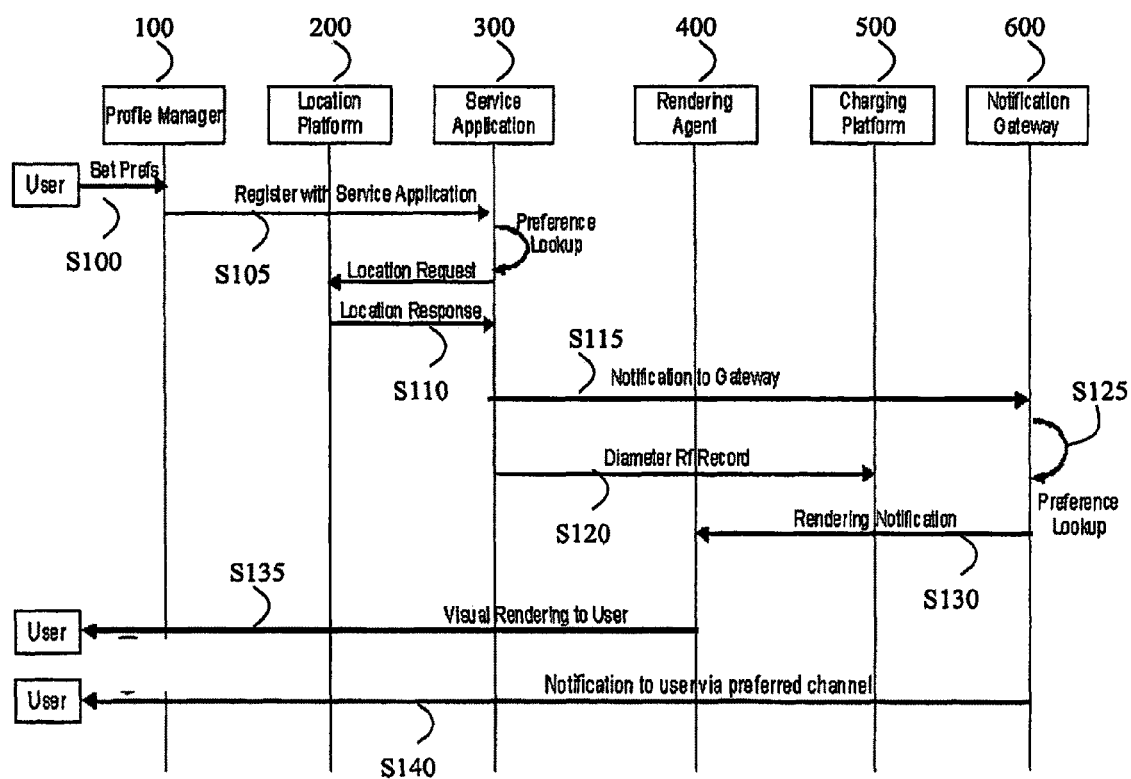
FIG. 2 shows a swim lane diagram of exemplary processes and roles in accordance with aspects of the invention.

FIG. 2 illustrates a swim lane diagram in accordance with the present invention. The steps of FIG. 2 may be implemented on the computer infrastructure of FIG. I, for example. The swim lane diagram may be representative of a flowchart and/or block diagram that illustrates the architecture, functionality, and operation of possible implementations of systems, methods and computer program products according to various embodiments of the present invention. In this regard, each step or player in the swim lane diagram may represent a module, segment, or portion of code, which comprises one or more executable instructions for implementing the specified logical function(s). It should also be noted that, in some alternative implementations, the functions noted in the swim lane diagram might occur out of the order noted in FIG. 2. For example, steps shown in succession may, in fact, be executed substantially concurrently, or may sometimes be executed in the reverse order, depending upon the functionality involved. Each step and combinations can be implemented by special purpose hardware-based systems that perform the specified functions or acts, or combinations of special purpose hardware and computer instructions and/or software, as described above.

The steps and players shown in FIG. 2 may be implemented and executed from either a server, in a client server relationship, or they may run on a user workstation (which can be generally represented in FIG. 1). Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system.

The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 2, several roles (modules) and respective processes for implementing the steps of the present invention are shown. Specifically, FIG. 2 shows the following modules: a profile manager 100, a location platform 200, a service application 300, a rendering agent 400, a charging platform 500 and a notification getaway 600. These modules can be implemented, as discussed above, in the infrastructure shown in FIG. 1 as any combination of software and hardware modules.

The profile manager 100 is configured and structured to set up the preferences of the mobile user. For example, the profile manager 100 can set up the mobile user preferences such as providing notifications to subscribing parties using, e.g., SMS, SIP, SMTP, Web Services, RSS Feeds and ATOM feed based notifications. The profile manager 100 can be implemented in a home subscriber server (HSS), in an IMS network or in another generic repository in a non-IMS context. The preferences can also be provided by the end users.

The location platform 200 is configured and structured to determine the location of the mobile user. The location platform 200 can be a service provider or carrier network infrastructure. In embodiments, the location platform can be an agent residing on the handheld device of the mobile user such as, for example, A-GPS.

The service application 300 is a web service configured and structured to receive and send location requests and location responses, respectively. In embodiments, the service application 300 can be Parlay X, for example. Those of skill in the art will readily recognize that Parlay X is designed to enable software developers to use capabilities from a telecommunication network (e.g., such as location).

The rendering agent 400 is configured and structured to visually render the location based services. More specifically, in implementation, the rendering agent 400 is a web server configured to visually render the location of the mobile user in, for example, HTML or XHTML. The visual rendering may be in the form of a tracking map. Those of skill in the art should understand that the rendering agent might be omitted or not used when the location information is provided as a text based message.

The charging platform 500 is configured and structured to charge a fee users of the system. In embodiments, the charging platform 500 is designed to provide charges different entities at different rates, depending on the charging model. For example, the charging platform 500 can charge a fee to any end user such as an advertiser, service or individual that wants to receive notifications and/or actual location information of the mobile user. The mobile user can also be charged for this service based on, for example, a subscription. In further embodiments, the charging platform 500 is designed and structured to charge a fee to advertisers or content providers for not only receiving the location information, but for sending advertisements or other content to the mobile user based on the location information.

The notification gateway 600 is configured and structured to send notifications to end-users. The notifications can be provided to a plurality of different subscribers, directly, or through the rending agent 400, as discussed herein.

Referring now to the processes of the present invention, at step S100, the mobile user logs into the profile manager and sets publication preferences using different options. For example, these preferences may be:
 Location Determination Frequency;
 Location Notification Channel Options;
 SIP based notification;
 SMS based notification;
 RSS/ATOM Feed; and/or
 SMTP based notification.

In embodiments, any end user can also set their preferences using the profile manager. For example, it is technologically possible for an end user to select a mode of receiving the location information of the mobile user such as, for example, by text messaging or a visually rendered map.

In this step or a separate step, a subscriber selects the target(s) that is to be monitored. That is, the end user subscribes to the location of another user. The authorization model can include an "opt out" by default, requiring a service and user-specific opt-in strategy. At step S105, the profile manager notifies the service application of the preferences, which is responsible for driving much of the remaining flow, as discussed herein.

At step S110, the service application communicates with the location platform within the communications network (still within the service plane of an IMS network). For example, the service application registers for notifications using Parlay X or other such protocols, using the provisioning parameters specified by the subscriber. The service application also requests location information from the location platform and receives such location information of the mobile user. The query for location information may be a standard location query using such protocols as Parlay X or Open LS.

Upon obtaining the location information, at step S115, the service application sends the location information to the intelligent notification gateway. At step S120, the service application can also send a charging record to an IMS compliant charging platform using the diameter based Rf protocol, for example. At step S125, the notification gateway refers to the preferences of the mobile user, e.g., determines the preferred method of sending the notification to the subscribing entities. The possible options include, for example, SMS, SIP, RSS, ATOM, SMTP, etc.

In the case of a visual rendering of the location information, the notification gateway provides a web service invocation to the rendering agent, e.g., notification to the rendering agent, at step S130. At step S135, the rendering agent will implement a visual representation of the user's location by, for example, rendering or updating a map to be displayed on the requesting user's handset or other computing device. The requesting user can then visually see the rendered content on a browser, as rendered by the rendering agent that implemented the web service endpoint addressed by the Web Service invocation. In the case that a visual rendering of the location information is not required, at step S140, a notification is sent directly to the end user device (end point) using a SIP (IMS) or other (non IMS) notification.

Figure 3:
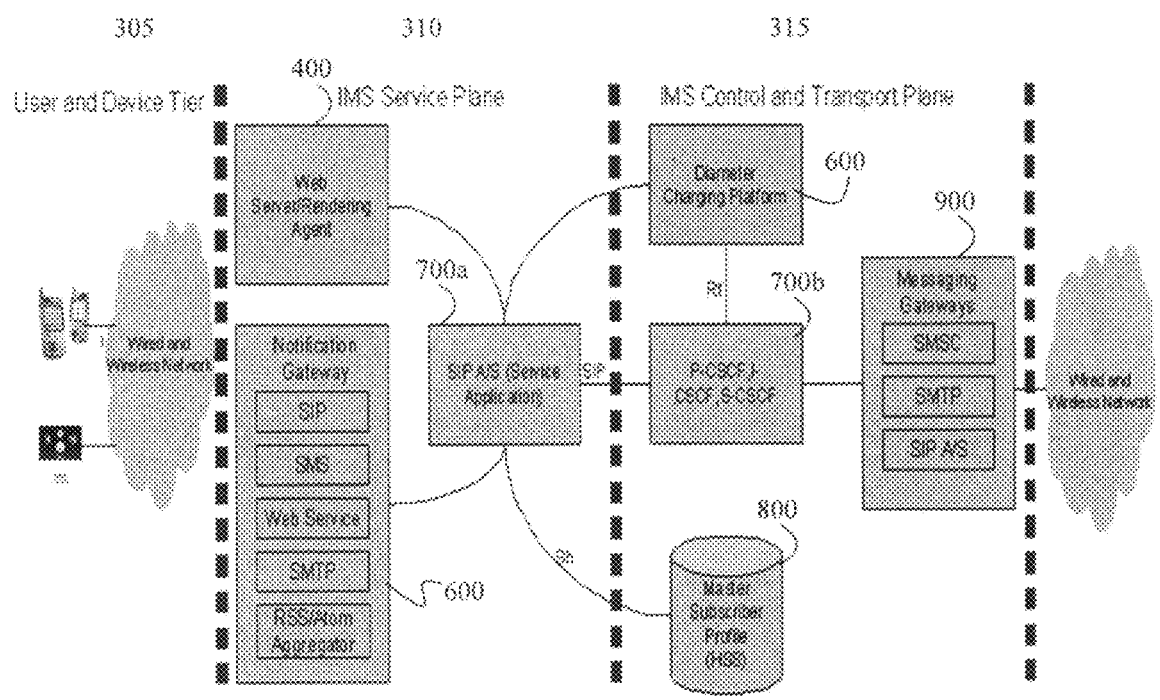
FIG. 3 shows an overview of a system architecture in accordance with aspects of the present invention.

FIG. 3 shows an overview of a system architecture in accordance with the present invention. The system architecture includes a user or device tier 305, as well as an IMS service plane 310 and an IMS control and transport plane 315. The user and device tier includes the mobile user and the users requesting the location information of the mobile user, e.g., content provider, advertisers, friends, family, etc. The users are connected to the IMS service plane 310 via a wired and/or wireless network.

The IMS service plane 310 includes the rendering agent 400 and notification gateway 600. The notification gateway 600 is configured to provide notifications using many different protocols such as, for example, SIP, SMS, Web Service, SMTP, RSS/ATOM aggregator, any of which can be a preferred preference selected by the mobile user for a specific end user device. The IMS service plane 310 also includes a session-initiated protocol 700a that communicates with a messaging module 700b of the IMS control and transport plane 315, as should be understood by those of skill in the art.

Still referring to FIG. 3, the IMS control and transport plane 315 includes the diameter charging platform 600 and a master subscriber profile database 800. The master subscriber profile database 800 can be implemented as a home subscriber server (HSS) database. The IMS control and transport plane 315 also includes the messaging module 700b and a message gateway 900. The messaging module 700b is provided to verify and confirm receipt of the messages. The message gateway 900 can be a secure message gateway for transporting SMSC, SMTP, SIP A/S, XML, SOAP and other message formats. Messaging gateways are known in the art such as those provided by International Business Machines Corp., e.g., WebSphere applications. (International Business Machines Corp. and WebSphere are registered trademarks of International Business Machines Corp.) As such, a further explanation of a messaging gateway is not required herein for one of skill in the art to fully appreciate and understand the present invention.

In conclusion, the present invention provides a tracking mechanism that users can subscribe to over multiple notification types that are non-IMS based like SMTP or RSS. The system and method also includes a system for charging for multiple notification types using Diameter Charging Platform.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a processor configured to:
      receive publication preferences of a mobile user, the publication preferences comprising at least one of location determination frequency, location notification channel options, SIP based notifications, SMS based notification, Rich Site Summary (RSS) and ATOM feed, and SMTP based notification;
      receive a subscription to location information of the mobile user from at least one other user;
      request the location information of the mobile user from a location platform;
      receive the location information from the location platform;
      send the location information to a notification gateway;
      publish the location information of the mobile user to the at least one other user using a publish subscribe format based on the publication preferences, the publish subscribe format comprising at least one of a SIP, SMS, RSS and the ATOM feed, and the publish subscribe format being provided by the publication preferences of the mobile user; and send a charging record to a charging platform using a diameter based protocol;

provide a visual rendering of the location information to the at least one other user based on the publication preferences.

2. The system of claim 1, wherein the processor is further configured to allow the mobile user to opt in or opt out of location based services.

3. The system of claim 1, wherein the location information is provided as a visual rendering to end users.

4. The system of claim 1, wherein the processor is at least one of maintained, deployed, created and supported on a computing infrastructure by a service provider.

5. The system of claim 1, wherein the processor publishes the location information on a collaborative network.

6. The system of claim 1, wherein the processor is a web service that is configured to provide the location information of the mobile user.

7. The system of claim 1, wherein the processor is further configured to:
   register the publish subscribe format; and
   visually render the location information and send the visually rendered location information to the at least one other user based on the publication preferences.

8. The system of claim 1, wherein:
   the processor is further configured to:
      allow the mobile user to opt in or opt out of location based services;
      register the publish subscribe format; and
      visually render the location information and send the visually rendered location information to the at least one other user.

* * * * *